United States Patent
Roehm

(10) Patent No.: US 7,530,234 B2
(45) Date of Patent: May 12, 2009

(54) METHOD FOR AIR-CONDITIONING A VEHICLE INTERIOR DEPENDENT ON INCIDENT SUNSHINE

(75) Inventor: Rolf Roehm, Jettingen (DE)

(73) Assignee: Daimler AG, Stuttgart (DE)

( * ) Notice: Subject to any disclaimer, the term of this patent is extended or adjusted under 35 U.S.C. 154(b) by 400 days.

(21) Appl. No.: 10/537,101

(22) PCT Filed: Nov. 5, 2003

(86) PCT No.: PCT/EP03/12302

§ 371 (c)(1),
(2), (4) Date: Dec. 30, 2005

(87) PCT Pub. No.: WO2004/050398

PCT Pub. Date: Jun. 17, 2004

(65) Prior Publication Data

US 2006/0117772 A1    Jun. 8, 2006

(30) Foreign Application Priority Data

Dec. 4, 2002    (DE) ................................ 102 56 866

(51) Int. Cl.
*F25D 17/00*    (2006.01)
*B60H 1/00*    (2006.01)

(52) U.S. Cl. ............................ 62/179; 62/180; 62/244; 165/202; 236/91 C; 250/206.1

(58) Field of Classification Search .................... 62/178, 62/179, 180, 133, 244; 165/202; 236/91 C; 250/206.1, 206.2

See application file for complete search history.

(56) References Cited

U.S. PATENT DOCUMENTS

| | | | |
|---|---|---|---|
| 4,491,727 A * | 1/1985 | Appelbaum et al. | 356/222 |
| 4,760,772 A | 8/1988 | Horiguchi et al. | |
| 4,890,460 A * | 1/1990 | Takasi et al. | 62/180 |
| 5,016,815 A * | 5/1991 | Doi et al. | 236/49.3 |
| 5,056,421 A * | 10/1991 | Iida | 454/75 |
| 5,181,654 A * | 1/1993 | Yoshimi et al. | 236/91 C |
| 5,186,682 A | 2/1993 | Iida | |
| 5,264,691 A * | 11/1993 | Hegyi | 250/203.4 |
| 5,337,802 A * | 8/1994 | Kajino et al. | 165/203 |
| 5,553,661 A * | 9/1996 | Beyerlein et al. | 165/203 |
| 6,087,650 A * | 7/2000 | Dage | 250/214 AL |
| 6,220,517 B1 | 4/2001 | Ichishi et al. | |
| 6,310,338 B1 * | 10/2001 | Blasing | 250/206.1 |
| 6,966,498 B2 * | 11/2005 | Huang et al. | 236/91 C |

* cited by examiner

*Primary Examiner*—Marc E Norman
(74) *Attorney, Agent, or Firm*—Crowell & Moring LLP

(57) ABSTRACT

A method for the air conditioning of a vehicle interior as a function of incident solar radiation. In a vehicle with, for example, a four-zone air conditioning system, the incident solar radiation is detected by means of sensor elements assigned to the various air conditioning zones in the vehicle and is used for regulating the air conditioning capacity. In order to avoid faulty regulation due to a detected incident solar radiation which does not influence or only slightly influences the passengers because of perpendicular incident radiation, for example, on the roof, the hood and the trunk lid, the incident radiation direction is determined by means of the sensor elements and the regulation of the air conditioning capacity is adapted correspondingly, so that the situation of too intensive cooling, for example in the case of perpendicular radiation on the vehicle roof, is avoided.

20 Claims, 2 Drawing Sheets

METHOD FOR AIR-CONDITIONING A VEHICLE INTERIOR DEPENDENT ON INCIDENT SUNSHINE

This application claims priority to International Patent Application No. PCT/EP2003/012302, filed Nov. 5, 2003, designating the United States of America, and German Application DE 102 56 866.9 filed on Dec. 4, 2002, the entire disclosure of which is incorporated herein by reference.

BACKGROUND AND SUMMARY OF THE INVENTION

The invention relates to a method for the air conditioning of a vehicle interior as a function of incident solar radiation.

German patent document DE 40 24 431 A1 discloses an air conditioning system with an incident solar radiation sensor arrangement having a plurality of sensor elements. In this case, first, the intensity and direction of the incident solar radiation are determined from the individual sensor output signals, after which these two variables serve for controlling an air conditioning system and further vehicle-side assemblies.

Also in a circuit arrangement, known from German patent document DE 43 05 446 A1, which includes an incident solar radiation sensor arrangement having a plurality of sensor elements. The intensity and direction of the incident solar radiation are first determined from individual sensor element output signals, after which these two variables serve for controlling an air conditioning system and further vehicle-side assemblies.

U.S. Pat. No. 4,760,772 likewise discloses an air conditioning system with an incident solar radiation sensor arrangement having three sensor elements, of which one is assigned to the vehicle front region and the other two are assigned to the two vehicle side regions or alternatively having four sensor elements, of which one is assigned to the vehicle front region, one is assigned to the vehicle rear region and the other two are assigned to the two vehicle side regions. In each case the intensity and direction of the incident solar radiation are determined from the sensor element output signals by means of a following computer unit, so that the air conditioning capacity of the air conditioning system can be set differently for various vehicle interior regions by means of these two calculated variables.

In U.S. Pat. No. 5,186,682, as in U.S. Pat. No. 4,760,772, the signal from two lateral incident solar radiation sensors of a common air conditioning unit is evaluated in terms of the intensity and direction of incidence of the sunlight. The single air conditioning controller unit then activates the existing air conditioning ducts as a function of the determined intensity and direction of the incident solar radiation.

Finally, German patent document DE 195 44 893 C2 discloses an air conditioning system for the air conditioning of a vehicle interior as a function of incident solar radiation, with at least two air conditioning ducts of individually controllable air conditioning capacity for the air conditioning of different vehicle interior regions, and with an incident solar radiation sensor arrangement having a plurality of sensor elements for detecting the incident solar radiation in different solid angle ranges. Each air conditioning duct is individually assigned its own sensor element of the incident solar radiation sensor arrangement and its own air conditioning controller unit. The sensor element assigned in each case detects the incident solar radiation essentially with a restriction to that solid angle range which corresponds positionally to the vehicle interior region air-conditioned by the respective air conditioning duct. The air conditioning controller unit assigned in each case sets the air conditioning capacity of the respective air conditioning duct as a function of the output signal from only the assigned sensor element of the incident solar radiation sensor arrangement.

Thus, by means of this prior art, an individual air conditioning of various regions of the vehicle interior as a function of incident solar radiation is possible.

However, the incident solar radiation sensor arrangement supplies only the solar values of the individual zones and the average value of these. The solar value of the individual zones is in this case used directly as a factor characteristic curve for temperature or blower regulation as a function of the outside temperature. That is the blown-air temperature is lowered as a result of the Sun's influence or the blower level is raised. This does not allow for whether the Sun is high or low with respect to the vehicle.

When the Sun is very high, all the values of the sensor elements of the incident solar radiation sensor arrangement have approximately the same value. Depending on the strength of the incident radiation, the values are higher or lower. In complete darkness, the sensor values indicate 0%, while, in the case of very strong incident solar radiation, the sensor values indicate a maximum of 125%. In the case of a very high solar load and when the Sun is very high, this means, for air conditioning regulation, that, although there is no incident solar radiation acting on the vehicle occupants since the incident solar radiation takes place on the vehicle roof and not through a window into the interior, in all the zones the blow-out temperature is lowered very sharply or the blower fraction is increased very sharply as a result of the incident solar radiation. This air conditioning regulation, however, is faulty and is very uncomfortable for the occupant/occupants.

The object of the present invention is, therefore, to develop the generic air conditioning system for the air conditioning of a vehicle interior as a function of incident solar radiation and a method for operating the air conditioning system in such a way that the abovementioned faulty air conditioning regulation which is very uncomfortable for the occupant/occupants is eliminated.

As a result of the calculation of the steepness of the sunlight or of the laterally specific incident solar radiation, it is possible, during automatic blower operation, to react to and counteract in a more focused manner the influencing factors/disturbing variables acting on the vehicle from outside, such as, for example, incident solar radiation from one side or steeply angled sunlight. The occupants, by manual action, can set the blower even more individually to their requirements. A marked improvement in air conditioning comfort is thereby achieved for the individual seat positions.

This and further objects, features and advantages of the present invention become obvious for the following description of a preferred exemplary embodiment of the invention, in conjunction with the drawing in which:

DETAILED DESCRIPTION OF THE INVENTION

According to the invention, the steepness of the sunlight is calculated by calculating the various solar values of the individual zones. The calculation of the sunlight steepness determines whether or not the incident solar radiation is acting on the occupants. With the aid of the sunlight steepness, a corresponding correction factor is determined, by means of which a highly accurate compensation of the blown-air temperature or of the blower increase due to the incident solar radiation is possible.

Figure 2:
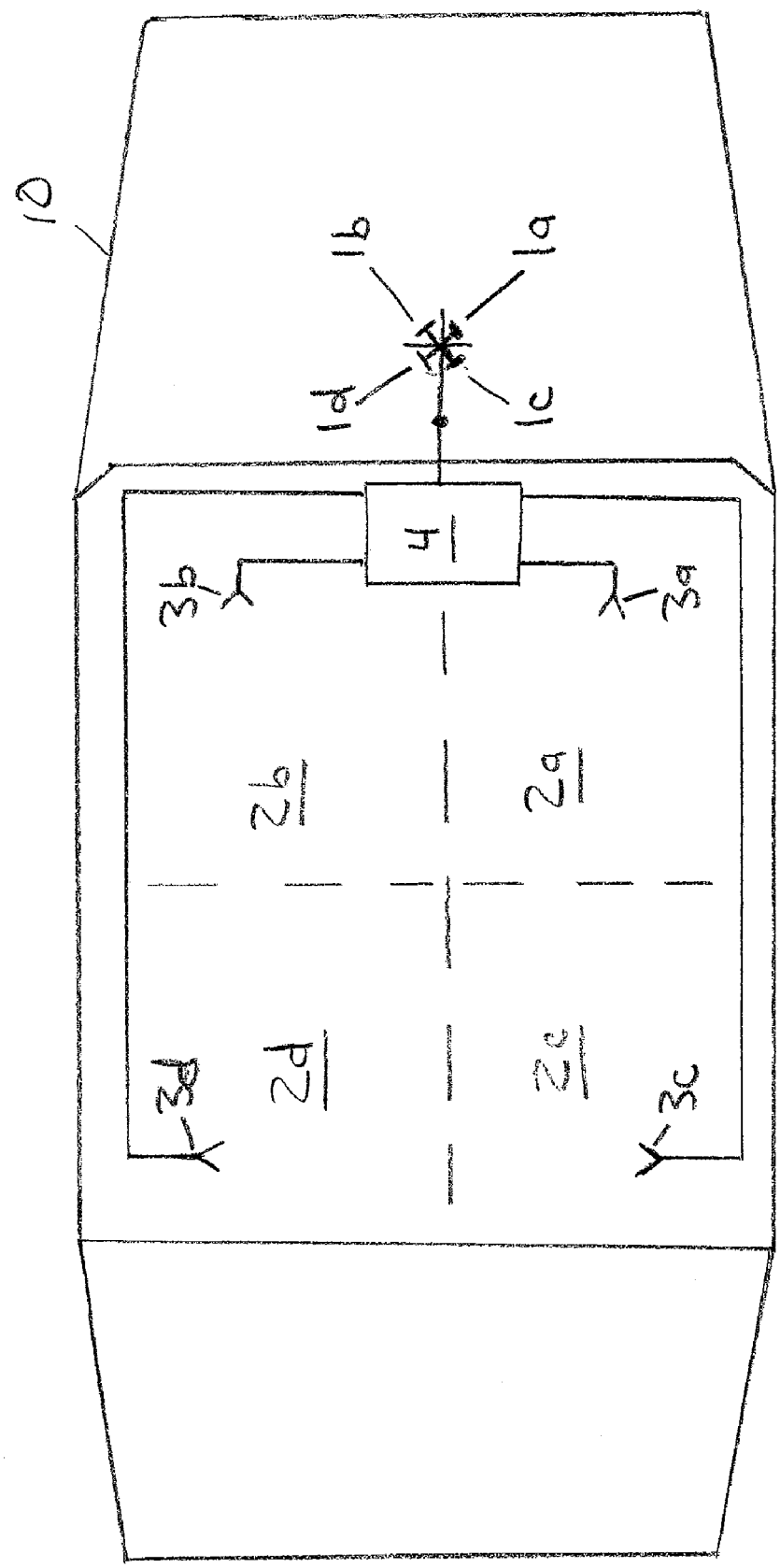
FIG. 2 is a schematic illustration of air conditioning component and sensor arrangements in accordance with an embodiment of the present invention.

The method for calculating the sunlight steepness is described in more detail below. In this case, the explanation is made by the example of a four-zone air conditioning system, as schematically shown in FIG. 2, but may be applied likewise to other multizone air conditioning systems with more or fewer zones.

First, the incident solar radiation is detected in different solid angle ranges, using four sensor elements $1a$ to $1d$, for example of a four-quadrant sensor. The sensor elements are in this case arranged in such a way that, for example, the first sensor element $1a$ detects the vehicle region at front right of vehicle 10, the second sensor element $1b$ the vehicle region at front left, the third sensor element $1c$ the vehicle region at rear right and the fourth sensor element $1d$ the vehicle region at rear left and are assigned to corresponding air conditioning regions $2a$-$2d$ in the vehicle, each of the air conditioning regions having a corresponding air conditioning duct $3a$-$3d$ fed by a blower and air distribution arrangement 4 which can vary the amount of air conditioning delivered to each duct.

Thereafter, taking into account output signals A1 to A4 from the first to fourth sensor elements $1a$ to $1d$ and an arithmetic average value $\bar{A}$ emitted by the solar sensor, a sunlight steepness S is calculated.

This sunlight steepness S may be calculated, for example, according to the following formula: $S=((|A2-A3|+|A1-A4|)/2*M/\bar{A}$, S being the sunlight steepness, A2 the output signal from a second sensor element $1b$ (FL), A3 the output signal from a third sensor element $1c$ (RR), A1 the output signal from a first sensor element $1a$ (FR), A4 the output signal from a fourth sensor element $1d$ (RL), M a multiplier and $\bar{A}$ the arithmetic average value of the output signals A1 to A4 from the first to fourth sensor elements.

The multiplier M amounts, for example, to 50 and is used in order to obtain a greater and therefore more easily illustratable value. The formula for calculating the sunlight steepness S is organized in such a way that S becomes the higher, the lower the angle of the incident solar radiation is. A Sun with a low angle of incident radiation and with a high value of sunlight steepness impinges upon more window areas and therefore requires more air conditioning and therefore higher air conditioning. Furthermore, by the sunlight steepness being calculated according to the invention, it is possible to reduce the probability of error, since, in the case of lower-angled incident radiation and therefore lower sensor output signals, the sunlight steepness becomes greater even in diffuse light, hazy weather and/or the brief effect of sunlight, and consequently minor errors cannot have such a great influence.

Figure 1:
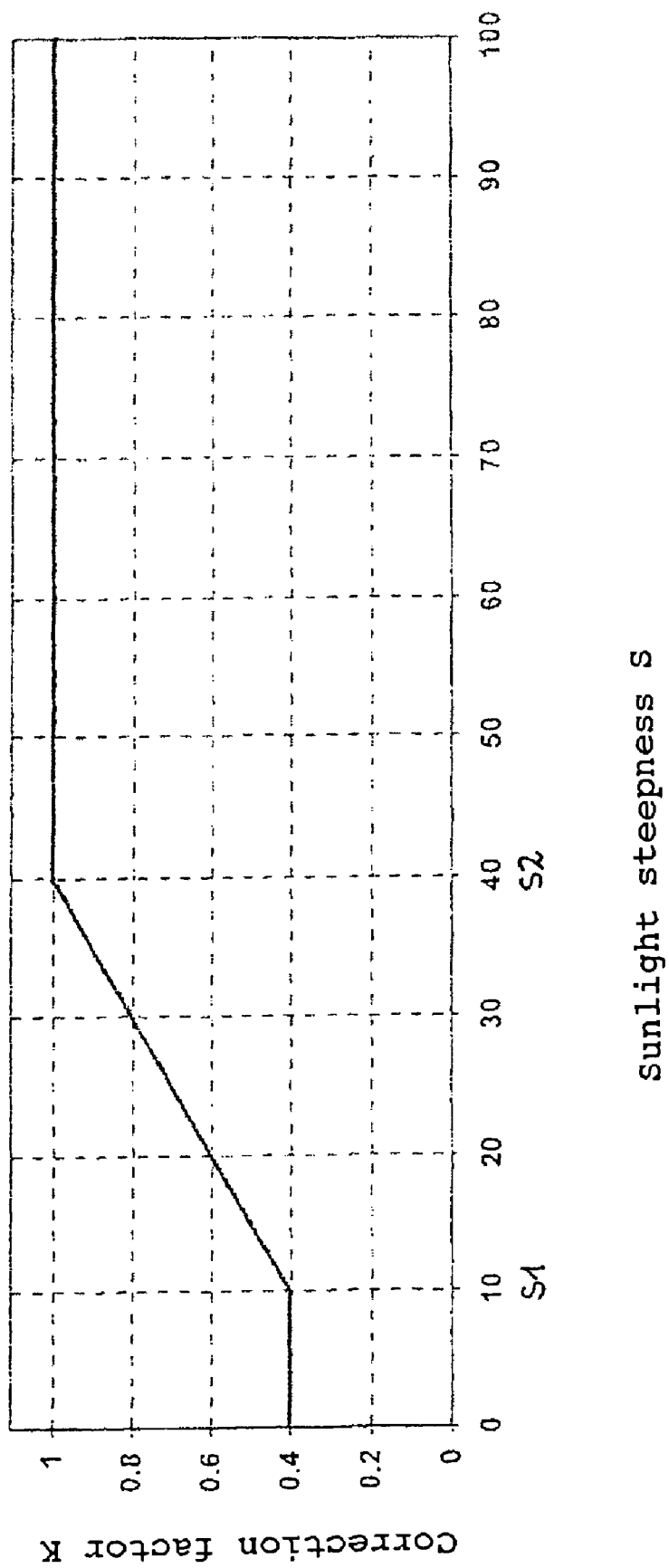
FIG. 1 shows an illustration of the sunlight steepness calculated according to the invention and of a factor, assigned to respective sunlight steepness, for varying the air conditioning regulation.

Subsequently, with the aid of the calculated sunlight steepness S, a correction factor K is determined which is applied to the air conditioning regulation values, such as, for example, the blow-in temperature and/or the blower power, which are calculated by the use of the sensor values, conventionally using a four-quadrant sensor, as a rule the blow-in temperature being lowered and the blower power being raised. FIG. 1 shows the profile of a correction factor K of this type in relation to the sunlight steepness S calculated by means of the formula according to the invention. The profile of the correction factor K is in this case vehicle-dependent and design-dependent, since, for example, influences of varying magnitude occur on the occupants in the case of window areas or window tilts of different size.

It is evident from FIG. 1 that, below a first threshold value S1 of the sunlight steepness, for example 10, a constant low connection factor, 0.4 in the example, is used, since incident solar radiation is very steep from above here, but insignificant changes do not lead to any appreciable changes in the influence on the occupants. Consequently, to improve comfort, conventionally calculated air conditioning regulation values are multiplied by the correction factor 0.4, in order to substantially reduce the air conditioning variance due to the incident solar radiation, since, because of the high steepness, scarcely any influence is exerted on the occupants. Likewise, in a range above a second threshold value S2 of the sunlight steepness, for example 40, the correction factor selected is once again constant, since, with the very low-angle incident solar radiation on which this sunlight steepness is based, only insignificant changes in the angle of incidence occur and therefore require no further adaptation of the air conditioning regulation. In the example, in the case of this very low-angle incident solar radiation and therefore high sunlight steepness above the second threshold value S2, the correction factor K is set at 1 and the air conditioning regulation values calculated, using the values of the four-quadrant sensor, are used, unchanged. In the range between these two threshold values S1 and S2, for example, a linear correction factor profile may be employed, as shown in FIG. 1.

Moreover, an adverse influence of cornerings on the air conditioning regulation is avoided by the sunlight steepness being determined according to the invention.

In summary, the present invention discloses a method for the air conditioning of vehicle interior as a function of incident solar radiation. In a vehicle with, for example, a four-zone air conditioning system, the incident solar radiation is detected by sensor elements assigned to the various air conditioning zones in the vehicle and is used for regulating the air conditioning capacity. In order to avoid faulty regulation due to a detected incident solar radiation which does not influence or only slightly influences the passengers because of perpendicular incident radiation, for example, on the roof, the hood and the trunk lid, the incident radiation direction is determined by means of a sensor element and the regulation of the air conditioning capacity is adapted correspondingly, so that the situation of too intensive cooling, for example in the case of perpendicular radiation on the vehicle roof, is avoided.

The invention claimed is:

1. A method for controlling air conditioning of a vehicle interior as a function of incident solar radiation, comprising the steps of:
   detecting incident solar radiation in different solid angle ranges by a plurality of sensor elements,
   determining of an air conditioning capacity of at least two air conditioning ducts of individually controllable air conditioning capacity for the air conditioning of different vehicle interior regions, the air conditioning capacity of each air conditioning duct being determined, in addition to taking into account an actual interior temperature, a desired interior temperature, an outside temperature and, optionally, a vehicle speed, as a function of an output signal from a sensor element assigned to each air conditioning duct or of an averaged output signal from a sensor element assigned to each air conditioning duct, calculating a sunlight steepness according to the following formula $$S=((|A2-A3|+|A1-A4|)/2*M/\bar{x},$$

S being the sunlight steepness, A2 an output signal from a second sensor element, A3 the output signal from a third sensor element, A1 an output signal from a first sensor element, A4 an output signal from a fourth sensor element, M a multiplier and $\bar{x}$ an arithmetic average value of the output signals A1 to A4 from the first to fourth sensor elements, determining a correction factor with the aid of the calculated sunlight steepness, determining a corrected air conditioning capacity by multiplication of the determined air conditioning capacity by the correction factor, and setting the corrected air conditioning capacity.

2. A method for the air conditioning of a vehicle interior as a function of incidence of solar radiation as claimed in claim 1, wherein the correction factor is determined as a function of the calculated sunlight steepness in a vehicle-dependent manner during measurements.

3. A method for the air conditioning of a vehicle interior as a function of incident solar radiation as claimed in claim 2, wherein the correction factor is constant below a first threshold value of the sunlight steepness and above a second threshold value of the sunlight steepness, the constant above the second threshold value being higher than the constant below the first threshold value, and the correction factor having a linear profile between the two threshold values.

4. The method for the air conditioning of a vehicle interior as a function of incident solar radiation as claimed in claim 3, wherein during the determination of the air conditioning capacity on the basis of the incident solar radiation, the blow-in temperature is lowered and the blower power is raised, and this raising/lowering is maintained or reduced by means of the correction factor.

5. The method for the air conditioning of a vehicle interior as a function of incident solar radiation as claimed in claim 3, wherein during the determination of the air conditioning capacity on the basis of the incident solar radiation, the blow-in temperature is lowered or the blower power is raised, and this raising/lowering is maintained or reduced by means of the correction factor.

6. The method for the air conditioning of a vehicle interior as a function of incident solar radiation as claimed in claim 3, wherein the selected multiplier is 50.

7. The method for the air conditioning of a vehicle interior as a function of incident solar radiation as claimed in claim 2, wherein during the determination of the air conditioning capacity on the basis of the incident solar radiation, the blow-in temperature is lowered and the blower power is raised, and this raising/lowering is maintained or reduced by means of the correction factor.

8. The method for the air conditioning of a vehicle interior as a function of incident solar radiation as claimed in claim 7, wherein the selected multiplier is 50.

9. The method for the air conditioning of a vehicle interior as a function of incident solar radiation as claimed in claim 2, wherein during the determination of the air conditioning capacity on the basis of the incident solar radiation, the blow-in temperature is lowered or the blower power is raised, and this raising/lowering is maintained or reduced by means of the correction factor.

10. The method for the air conditioning of a vehicle interior as a function of incident solar radiation as claimed in claim 9, wherein the selected multiplier is 50.

11. The method for the air conditioning of a vehicle interior as a function of incident solar radiation as claimed in claim 2, wherein the selected multiplier is 50.

12. A method for the air conditioning of a vehicle interior as a function of incident solar radiation as claimed in claim 1, wherein the correction factor is constant below a first threshold value of the sunlight steepness and above a second threshold value of the sunlight steepness, the constant above the second threshold value being higher than the constant below the first threshold value, and the correction factor having a linear profile between the two threshold values.

13. The method for the air conditioning of a vehicle interior as a function of incident solar radiation as claimed in claim 12, wherein during the determination of the air conditioning capacity on the basis of the incident solar radiation, the blow-in temperature is lowered and the blower power is raised, and this raising/lowering is maintained or reduced by means of the correction factor.

14. The method for the air conditioning of a vehicle interior as a function of incident solar radiation as claimed in claim 12, wherein during the determination of the air conditioning capacity on the basis of the incident solar radiation, the blow-in temperature is lowered or the blower power is raised, and this raising/lowering is maintained or reduced by means of the correction factor.

15. The method for the air conditioning of a vehicle interior as a function of incident solar radiation as claimed in claim 12, wherein the selected multiplier is 50.

16. The method for the air conditioning of a vehicle interior as a function of incident solar radiation as claimed in claim 1, wherein during the determination of the air conditioning capacity on the basis of the incident solar radiation, the blow-in temperature is lowered and the blower power is raised, and this raising/lowering is maintained or reduced by means of the correction factor.

17. The method for the air conditioning of a vehicle interior as a function of incident solar radiation as claimed in claim 16, wherein the selected multiplier is 50.

18. The method for the air conditioning of a vehicle interior as a function of incident solar radiation as claimed in claim 1, wherein during the determination of the air conditioning capacity on the basis of the incident solar radiation, the blow-in temperature is lowered or the blower power is raised, and this raising/lowering is maintained or reduced by means of the correction factor.

19. The method for the air conditioning of a vehicle interior as a function of incident solar radiation as claimed in claim 18, wherein the selected multiplier is 50.

20. The method for the air conditioning of a vehicle interior as a function of incident solar radiation as claimed in claim 1, wherein the selected multiplier is 50.

* * * * *